Patented May 12, 1936

2,040,183

UNITED STATES PATENT OFFICE 2,040,183

THERAPEUTICS FOR KILLING BACTERIA

Iwan Ostromislensky, New York, N. Y., assignor to Ostro Research Laboratories, Inc., New York, N. Y., a corporation of New Jersey No Drawing. Application March 25, 1932, Serial No. 601,287

14 Claims. (Cl. 167—65)

This invention has for its object the production of medicines that are useful for killing or rendering harmless or innocuous bacteria such as various bacilli, cocci, etc. that cause contagious or infectious diseases in animals, especially human beings, whether by attacking the skin, mucous membrane, intestinal or urinal tract or other external or internal organs, and also the application of these medicines for these purposes. By this invention the germicidal or disease inhibiting effect is produced without appreciable toxic effect to main whether applied externally or internally.

It is also known that some simple mononuclear derivatives of aniline, such as ortho-, meta-, and para-phenylendiamine, tolylendiamine, monochlor orthoanisidin, etc., are highly bactericidal, although they are also highly toxic to human beings, thus precluding their use as therapeutics.

By the present invention therapeutic products are obtained from amino-phenol or its derivatives, that are non-toxic and possess an extraordinarily high bactericidal power and the power to inhibit the growth of bacteria even when diluted to a very high degree. The aminophenols that are useful for this purpose are of the general formula

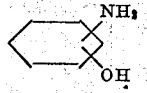

These aminophenols and derivatives thereof may be regarded as benzol containing a free amino and a free hydroxyl group and derivatives of such benzols. The ortho amino-phenol is especially suitable for therapeutic purposes as it is bactericidal when diluted 1:40,000. The para aminophenol is bactericidal in 1:10,000 dilution. The meta aminophenol is much less potent. The introduction of another amino or hydroxyl group into the benzol nucleus of ortho aminophenol lowers its bactericidal power, while the introduction of such groups into the para-isomer considerably increases its bactericidal power. The introduction of a chlorine alone into the benzol nucleus of active aminophenols or their homologues increases their bactericidal power although the acid salts of chloraminophenols are not soluble in water to a great extent. However, the introduction of a bromine or iodine atom, a nitrogroup, or a radical of the ethers of fatty acids ($RCH_3COO-$) into the benzol nucleus greatly decreases the bactericidal power, and the introduction of radicals of carboxyl or sulphonic acid practically destroys it. Acetylization of the amino group or substitution of alkyl groups ($C_nH_{2n+1}$) for the hydrogen atoms of the amino also decreases and sometimes destroys the bactericidal power. Substitution of alkyl groups for the hydrogen of the hydroxyl destroys the bactericidal power. Substitution of phenyl or other aryl group for a hydrogen in the nucleus of aminophenol lowers the bactericidal power, but a similar substitution of an alkyl group usually produces very little, if any, change in bactericidal power.

The formula for the aminophenols which in accordance with this invention can be used for therapeutic purposes may be represented thus:

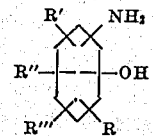

provided the amino and hydroxyl do not occupy the meta position with respect to each other and none of their H atoms is replaced by a radical. One of the R's may be replaced by chlorine, and when the amino and hydroxyl occupy the para position any of the R's may be replaced by alkyl groups or may be hydrogen atoms.

The following are given as specific examples of preparation of particular aminophenols which illustrate this invention and produce products which possess very high bactericidal power:

*Example 1.—Preparation of diethylparaaminophenol*

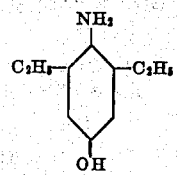

Diazotized sulphonilic acid is coupled with metadiethylphenol in the well known way. The azo-compound obtained is reduced in its mother liquor by means of sodium hydrosulphite until the disappearance of coloring. Diethylaminophenol which is precipitated may be recrystallized from boiling water to which has been added a trace of sodium sulphite. The compound is difficultly soluble in cold water. The compound consists in small colorless or almost colorless needles with melting point at 112°–113° C. This aminophenol may also be recrystallized from boiling benzol or carbon-tetrachloride. It is easily soluble in ether, acetone and acetic acid. It dissolves in acid and bases, particularly in ammonia, but precipitates at its isoelectric point. The hydrochloride of diethylaminophenol is easily obtained by careful introduction of fuming hydrochloric acid into the ether solution of the amphoteric base; a snow-white, crystalline precipitate is obtained, which may be washed for purification in anhydrous acetone.

*Example 2.—Preparation of diethylparaaminophenol*

1.4,-diethyl-2-amino-5-hydroxybenzol (paradiethyl of para-aminophenol)

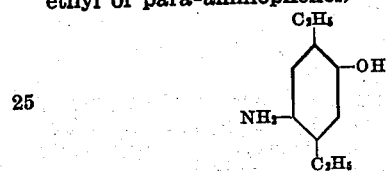

was prepared by nitrating, reducing, etc. according to the following scheme:

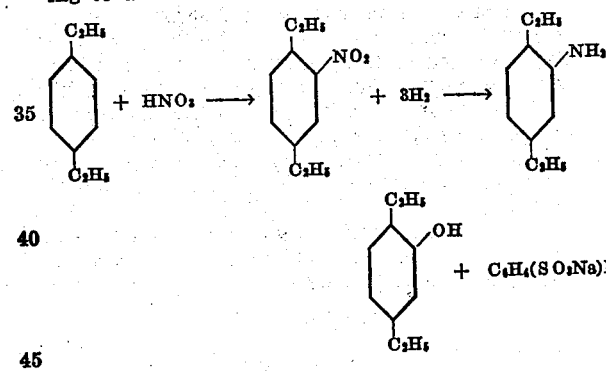

The azo-compound that was obtained from the diazotized sulphonilic acid of orthometadiethylphenol was reduced by using sodium hydrosulphite. It has been found that the intermediate azo-compound can be easily reduced in its mother liquid.

Commercial diethylaminophenol of this structural formula may be recrystallized from a very small quantity of boiling carbon tetrachloride. It is easily soluble in cold benzol, ether, alcohol, and acetone; but is insoluble in cold petroleum ether. When the ether solution is distilled the substance remains on the bottom of the vessel in the form of very brilliant colorless crystalline scales or leaves, with melting point of 120°–122° C.

*Example 3.—Preparation of paraisoamylorthoaminophenol*

Into the dark, almost black, alkaline solution of azo-dye obtained by coupling diazotized sulphonilic acid with paraamylphenol, is poured a 20% solution of sodium hydosulphite ($Na_2S_2O_4$), in a quantity considerably greater than the theoretical one to serve as a reducing agent. The mixture is boiled until the color disappears. It is permitted to stand for about a day, the precipitate which forms is filtered and washed by cold water. It is again dissolved in hot water, impurities are extracted with charcoal, filtered, and it is then allowed to recrystallize from the cold solution. The preparation may be dried in a dessicator and recrystallized several times from boiling carbon tetrachloride until its melting point becomes constant. Ordinarily, two or three recrystallizations are sufficient for this. The substance consists of small colorless prismatic crystals with well-formed surfaces with a melting point of about 133° C.

*Example 4.—Preparation of monochloraminothymol*

Monochloraminothymol may be obtained by chlorinating aminothymol that has been obtained from thymol in a manner quite analogous to that given in Example 3 for obtaining the amylaminophenol. The chlorination of the aminothymol is accomplished by an excess of chlorine in a solution of glacial acetic acid.

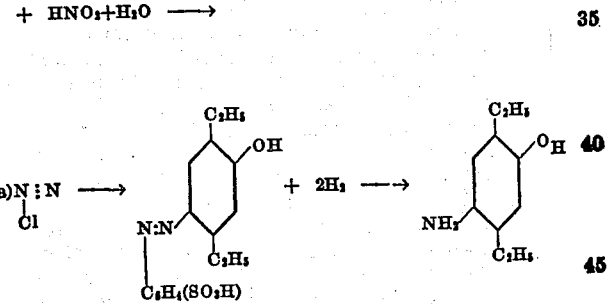

*Example 5.—Preparation of phenylparaaminophenol*

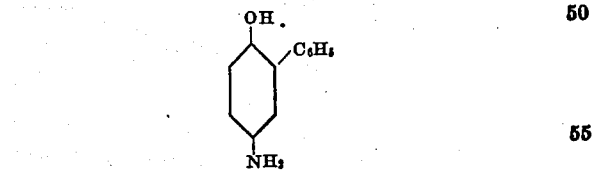

This may be accomplished by coupling orthophenylphenol with diazotized sulphonilic acid in an alkaline solution and then reducing the resulting azo-compound by means of sodium hydrosulphite. When it has been recrystallized from ethyl alcohol with the application of charcoal the substance is obtained in the form of a mass of small crystals with melting point of 195° C.

The aminophenol which I have thus far found to possess the greatest bactericidal power is para-aminothymol

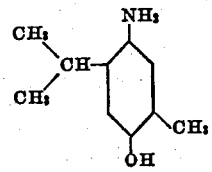

The next in bactericidal power are aminocarvacrol, diethyl-aminophenol, dimethylaminophenol, and orthoaminophenol.

The following aminophenols have also been found to be useful for this purpose:

Paramethylorthoaminophenol, paraisoamylorthoaminophenol, diethylchloraminophenol, monochloraminothymol and paraaminophenol.

A close study of the bactericidal properties of a large number of these aminophenols has shown that the most active of them kills *Staph. albus, Staph. aureous,* and *Strep. Hem.* in 1:80,000 solution with 24 hours. Similarly, *Bacillus coli Com.* is easily destroyed in dilution of 1:20,000 by it.

When subcutaneously injected, the preparation is tolerated by animals in doses of 0.3 grams per kilogram of their weight. When 0.2 grams of the preparation are daily administered per os for ten days rabbits do not show any concomitant reactions and remain alive.

The autopsy of rabbits killed for experimentation after a week of administration of it did not show any traces of poisoning. Urine of man after the administration of 0.6 grams of the preparation possesses normal coloring. However, after some time, even if kept in a closed vessel, this urine gradually darkens, finally taking on a dark brown color.

I claim:

1. The process of rendering pathogenic microorganisms innocuous in animals, which comprises internally administering to the animals aminophenol of the formula

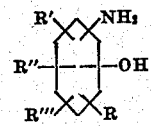

in which the amino and hydroxyl groups are in position other than the meta with respect to each other and in which at least one of the R's represents an alkyl group and each one of the other R's is a member of the series alkyl and hydrogen.

2. The process of rendering pathogenic microorganisms innocuous in animals, which comprises internally administering to the animals aminophenol of the formula

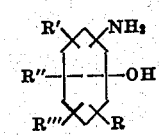

in which the amino and hydroxyl groups are in position other than the meta with respect to each other and the R's are monovalent substituents, one of which represents chlorine that takes the place of a hydrogen atom of the nucleus and each of the other R's are members of the series hydrogen and alkyl.

3. The process of rendering pathogenic microorganisms innocuous in animals, which comprises internally administering to the animals a solution of non-toxic white crystalline amino-phenol of the formula

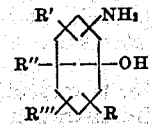

in which the amino and hydroxyl groups are in position other than the meta with respect to each other and in which at least one of the R's represents an alkyl group and each of the other R's is a member of the series alkyl and hydrogen.

4. The process of rendering pathogenic microorganisms innocuous in animals, which comprises internally administering to the animals amino phenol in which the amino and hydroxyl groups are in position other than meta with respect to each other and in which at least one hydrogen atom of the nucleus is substituted by a monovalent hydrocarbon radical.

5. The process of rendering pathogenic microorganisms innocuous in animals, which comprises internally administering to the animals amino phenol in which the amino and hydroxyl groups are in position other than meta with respect to each other and in which at least two hydrogen atoms of the nucleus are substituted by alkyl groups.

6. The process of rendering pathogenic microorganisms innocuous in animals, which comprises internally administering to the animals amino phenol in which the amino and hydroxyl groups are in position other than meta with respect to each other and in which two hydrogen atoms of the nucleus in para position with respect to each other are substituted by alkyl groups.

7. The process of rendering microorganisms innocuous in animals, which comprises internally administering to the animals a para amino phenol in which two hydrogen atoms of the nucleus in para position with respect to each other are substituted by alkyl groups.

8. The process of rendering pathogenic microorganisms innocuous in animals, which comprises internally administering to the animals a compound chosen from the group para amino thymol, para amino carvacrol, para amino xylenol, and 2,5-ethyl-4-amino-phenol.

9. The process of rendering pathogenic microorganisms innocuous in animals, which comprises internally administering to the animals para amino thymol.

10. A germicide for therapeutic purposes suitable for internal administration to animals comprising amino phenol of the formula

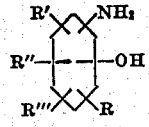

in which the amino and hydroxyl groups are in position other than the meta with respect to each other and in which at least one of the R's represents an alkyl group and each of the other R's is a member of the series alkyl and hydrogen.

11. A germicide for therapeutic purposes suitable for internal administration to animals comprising amino phenol in which the amino and hydroxyl groups are in position other than the meta with respect to each other and in which at least one hydrogen atom of the nucleus is substituted by a monovalent hydrocarbon radical.

12. A germicide for therapeutic purposes suitable for internal administration to animals comprising amino phenol in which the amino and hydroxyl groups are in position other than the meta with respect to each other and in which at least two hydrogen atoms are substituted by alkyl groups.

13. A germicide for therapeutic purposes suitable for internal administration to animals comprising a para amino phenol in which two hydrogen atoms of the nucleus are substituted by alkyl groups.

14. A germicide for therapeutic purposes suitable for internal administration to animals comprising para amino thymol.

IWAN OSTROMISLENSKY.